June 10, 1924.
E. H. LAMB
1,497,104
SOLDERING IRON HEATING FURNACE
Filed July 21, 1923
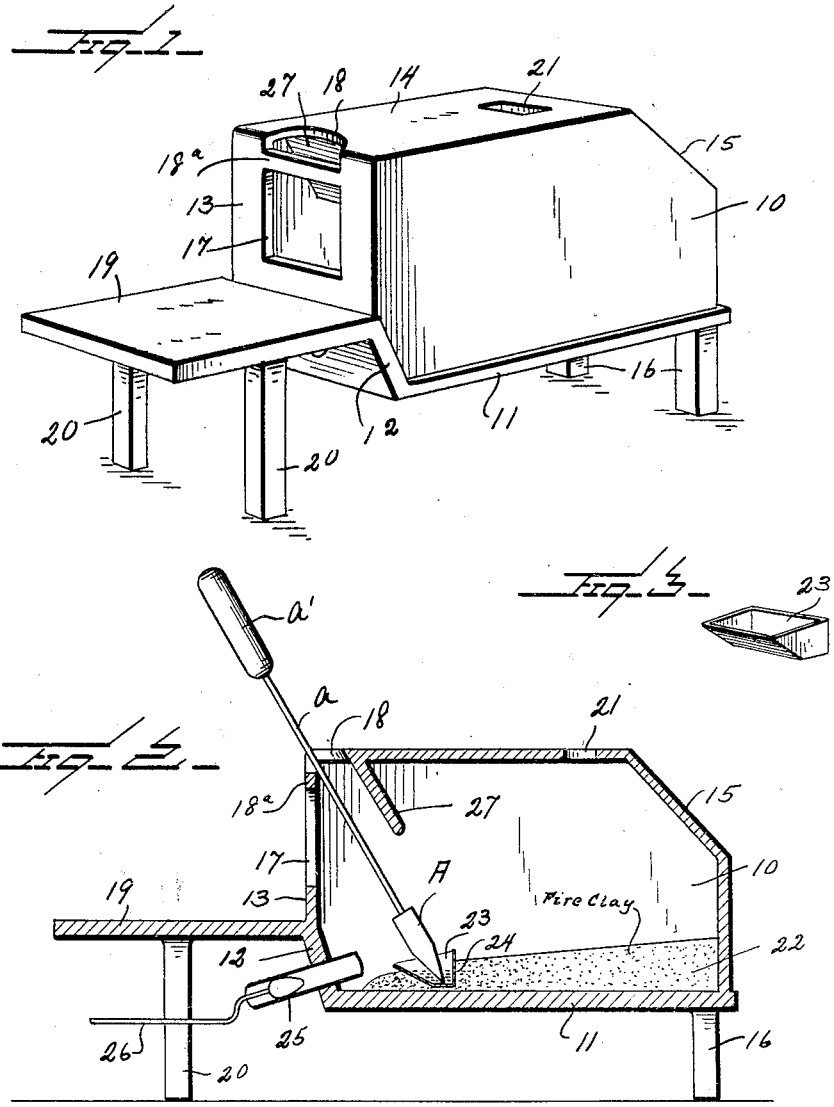
INVENTOR.
E. H. Lamb
BY Watson E. Coleman
ATTORNEY.

Patented June 10, 1924.

1,497,104

UNITED STATES PATENT OFFICE.

ERWIN H. LAMB, OF SANTA ROSA, CALIFORNIA.

SOLDERING-IRON HEATING FURNACE.

Application filed July 21, 1923. Serial No. 652,913.

*To all whom it may concern:*

Be it known that I, ERWIN H. LAMB, a citizen of the United States, residing at Santa Rosa, in the county of Sonoma and State of California, have invented certain new and useful Improvements in Soldering-Iron Heating Furnaces, of which the following is a specification, reference being had to the accompanying drawings.

This invention relates to devices for heating soldering irons, and the general object of the invention is to provide a furnace which will heat a soldering iron without burning off the tin.

All soldering iron furnaces known to me are of such form and shape that it is difficult to heat an iron without burning the tin from it and this necessitates that before the iron can be used for soldering it must be cleaned and re-tinned.

More specifically, one of the objects of my invention is to provide a construction of this character having therein a solder pool with means for heating and melting the solder in the pool, the furnace being further so constructed that the tip of the iron may be inserted within the solder pool so that the melted solder will form around the point of the iron, protect it from the severe heat, and so that when the iron is taken out of the furnace it will be heated and ready for use.

Other objects will appear in the course of the following description.

My invention is illustrated in the accompanying drawings, wherein:—

Figure 1 is a perspective view of a soldering iron heater constructed in accordance with my invention;

Figure 2 is a vertical longitudinal section thereof;

Figure 3 is a perspective view of the metallic solder pool;

Referring to these drawings, 10 designates the body of the soldering furnace, this body being formed of cast iron or any other suitable material and having a bottom 11 with an upwardly projecting wall 12 at its forward end, this wall being extended upward, as at 13, to form the front of the furnace, then extended rearward, as at 14, and downward and rearward, as at 15, and so to the bottom. This bottom is provided with legs 16 and the front 13 is formed with an inspection port 17 and an opening 18, which opening is partly in the front wall and partly in the top wall 14 through which the soldering iron is to be inserted. This opening 18 is separated from the opening 17 by a cross bar 18ª which forms a rest for the soldering iron. A shelf 19 extends outward from the wall 12, this shelf being provided with a support 20. A heat outlet 21 is provided in the upper wall 14.

The bottom of the furnace is covered with fire clay 22, this fire clay preferably sloping downward from the rear wall of the furnace toward the front wall and partially embedded in this fire clay is a solder pool 23 which may be formed either as a recess in the fire clay 22 itself or may be formed by embedding a cast iron cup 24 therein. This solder pool is just large enough to hold the point of the soldering iron A, this soldering iron being provided with the usual shank *a* and handle *a'*. Extending through the front wall 12 is a gas burner 25 of any suitable character and connected to a gas line 26 whereby air and gas may be discharged into the furnace against the fire clay and over the solder pool or against the front wall thereof if this solder pool is formed by a cast iron or other metal cup.

In the operation of this device, the cup is filled with solder and when the gas is turned on through the gas line and the burner is lighted, the flame will heat the face of the soldering iron, while part of the flame will strike the solder pool or pass over the top of the solder therein and the solder will be melted very quickly. This melted solder forms around the point of the iron and forms a pool of molten solder in which the point of the iron is immersed. This pool of melted solder protects the point of the iron from severe heat and when the iron is taken out it is tinned and ready for use.

It will be noted that the iron is inserted through the opening 18 and that there is a flange 27 which extends downward and rearward toward the solder tool, this flange acting to protect the shank *a* of the iron from the heat within the furnace. Furthermore, it will be seen that the wall 13 protects the operator from the heat of the furnace and the wall 18 with the wall 27 act to keep the handle from getting overheated. The inspection port 17 is preferably glazed with mica or like refractory material.

I do not wish to be limited to the exact details of construction, as it is obvious that these may be varied in many ways without departing from the spirit of the invention.

I claim :—

1. A soldering iron heating furnace formed with an opening for the entrance of the soldering iron and having a pool in its bottom and adapted to contain melted solder and in which the point of the iron may be immersed, and means for discharging heat toward said pool and against the iron.

2. A soldering iron heating furnace comprising a hollow body having front, rear, bottom, top and side walls, the bottom of the furnace having a solder pool in its bottom, a wall of the furnace being formed to provide an opening through which the iron may be inserted into said pool, and means for discharging a flame toward the solder pool and against the iron.

3. A soldering iron heating furnace comprising a body having a front wall, a top wall, a rear wall, a bottom and side walls, the floor of the furnace being formed of refractory material and said floor having a solder pool in its bottom adjacent the front end of the furnace, the top and front walls being formed to provide an opening through which the soldering iron may be inserted with its point immersed in said pool, and means entering through one of said walls for discharging a flame toward the solder pool and against the iron.

4. A soldering iron heating furnace comprising a body having a bottom, front, top, side and back walls, the top being provided with a heat outlet and the top and front wall being formed to provide an opening for the insertion of a soldering iron, the bottom of the furnace having a refractory floor and having a solder pool and there being means entering the front wall of the furnace at the front of the floor whereby a flame may be directed against said solder pool and against the iron immersed therein.

5. A soldering iron heating furnace comprising a body having a bottom, front, top, side and back walls, the top being provided with a heat outlet and the top and front walls being formed to provide an opening for the insertion of a soldering iron, the bottom of the furnace having a refractory lining, this lining having embedded therein a metallic cup constituting a solder pool and there being means entering the front wall of the furnace at the front of the floor whereby a flame may be directed against said cup and against the iron immersed therein.

6. A soldering iron heating furnace comprising a body having a bottom, front, top, side and back walls, the top being provided with a heat outlet and the top and front walls being formed to provide an opening for the insertion of a soldering iron, the bottom of the furnace having a refractory floor and having a solder pool and there being means entering the front wall of the furnace at the front of the floor whereby a flame may be directed against said solder pool and against the iron immersed therein, and a baffle flange extending downward from the top of the furnace rearward of the opening for the insertion of said iron, this baffle flange being directed downward and toward the solder pool and acting as a shield to prevent overheating of the handle.

In testimony whereof I hereunto affix my signature.

ERWIN H. LAMB.